Figure 1:
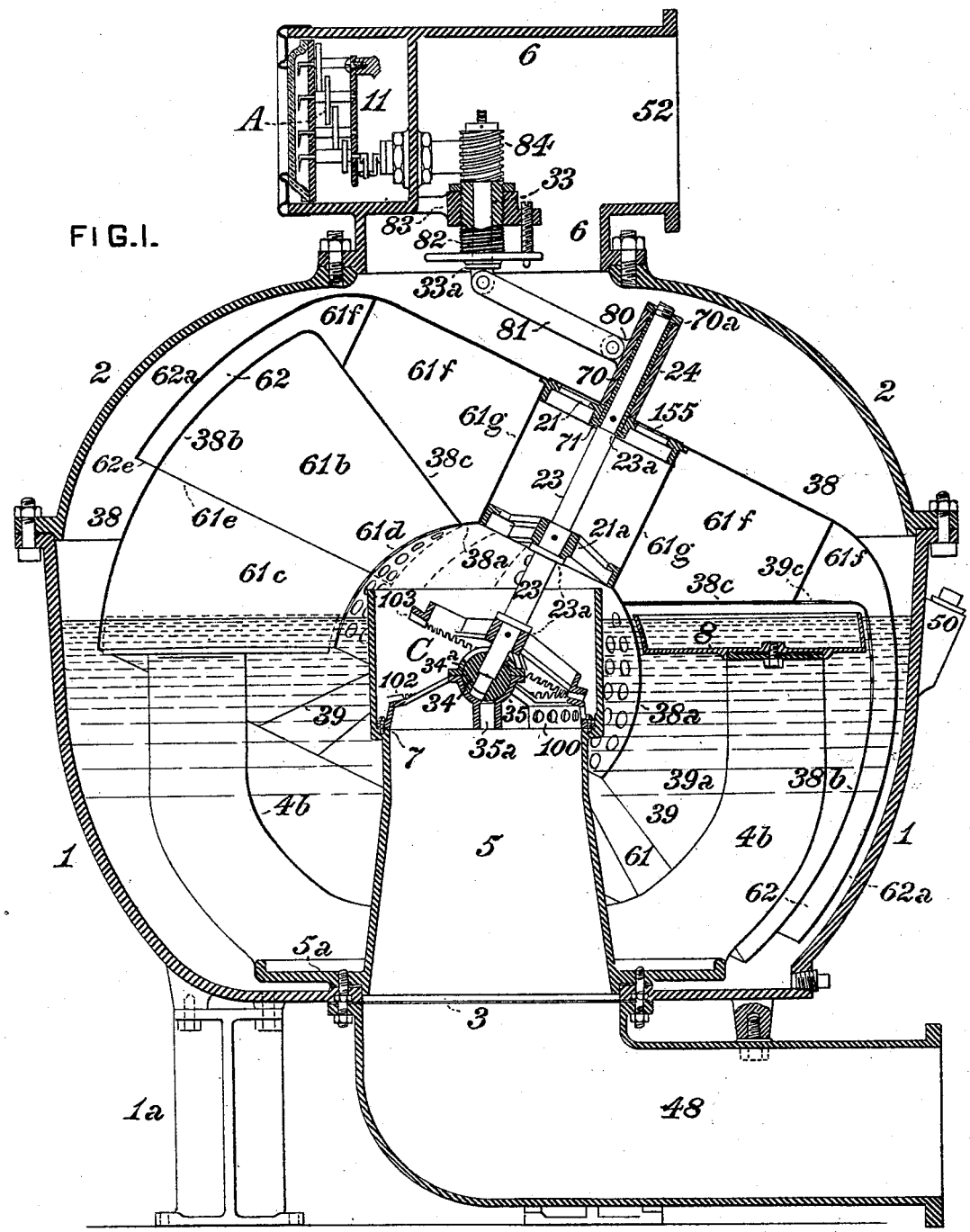

(No Model.) 9 Sheets—Sheet 2.

C. N. DUTTON.
GAS METER.

No. 459,328. Patented Sept. 8, 1891.

WITNESSES:
E. Newell.
F. E. Gaither

INVENTOR,
Chauncey N. Dutton,
BY Snowden Bell,
ATTORNEY.

THE NORRIS PETERS CO., PHOTO-LITHO., WASHINGTON, D. C.

(No Model.) 9 Sheets—Sheet 3.

C. N. DUTTON.
GAS METER.

No. 459,328. Patented Sept. 8, 1891.

WITNESSES:
E. Newell.
F. E. Gaither.

INVENTOR,
Chauncey N. Dutton,
BY Snowden Bell,
ATTORNEY.

(No Model.) 9 Sheets—Sheet 4.
C. N. DUTTON.
GAS METER.

No. 459,328. Patented Sept. 8, 1891.

WITNESSES:
E. Newell.
F. E. Gaither

INVENTOR,
Chauncey N. Dutton,
BY Snowden Bell,
ATTORNEY.

(No Model.)  9 Sheets—Sheet 5.

C. N. DUTTON.
GAS METER.

No. 459,328. Patented Sept. 8, 1891.

WITNESSES
E. Newell.
F. E. Gaither

INVENTOR,
Chauncey N. Dutton,
BY Snowden Bell,
ATTORNEY.

THE NORRIS PETERS CO., PHOTO-LITHO., WASHINGTON, D. C.

(No Model.) 9 Sheets—Sheet 6.

C. N. DUTTON.
GAS METER.

No. 459,328. Patented Sept. 8, 1891.

WITNESSES:
E. Newell.
F. E. Gaither

INVENTOR,
Chauncey N. Dutton
BY Snowden Bell,
ATTORNEY.

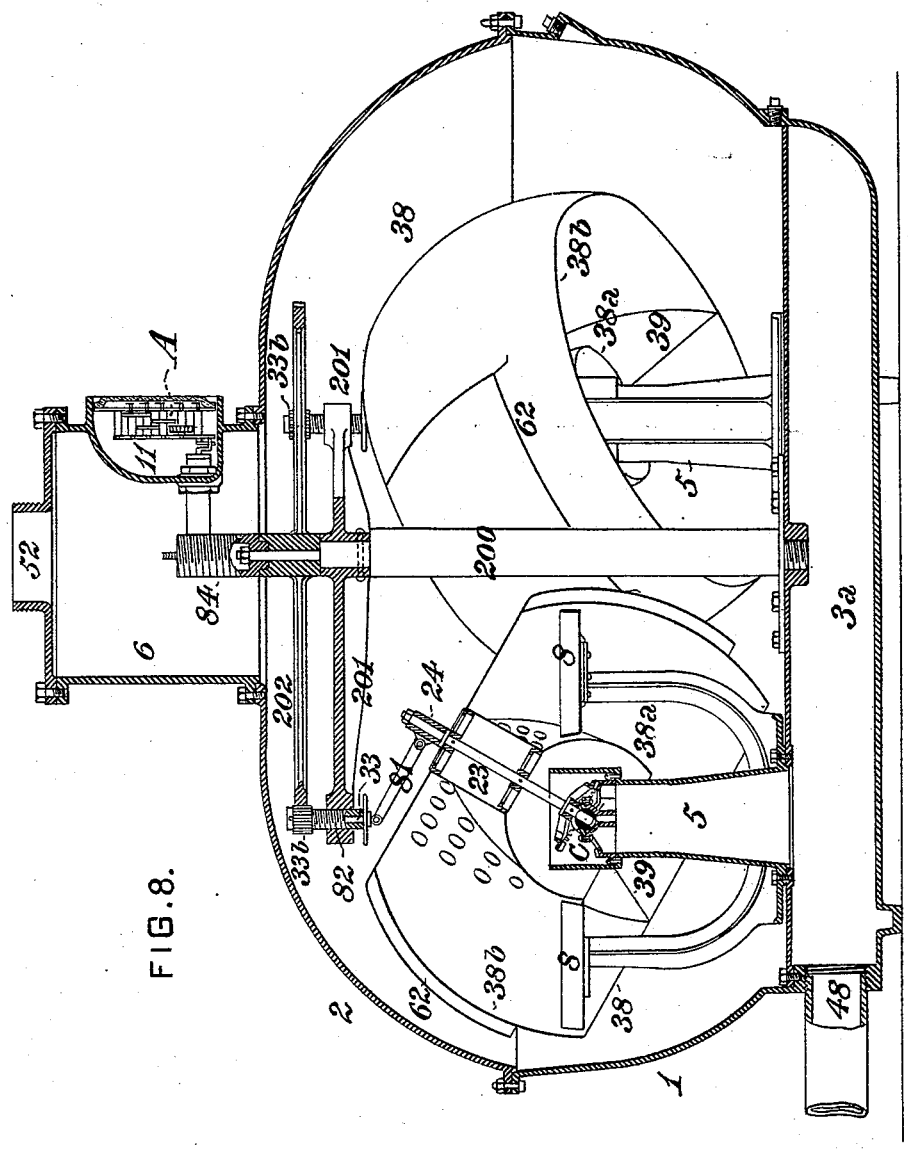

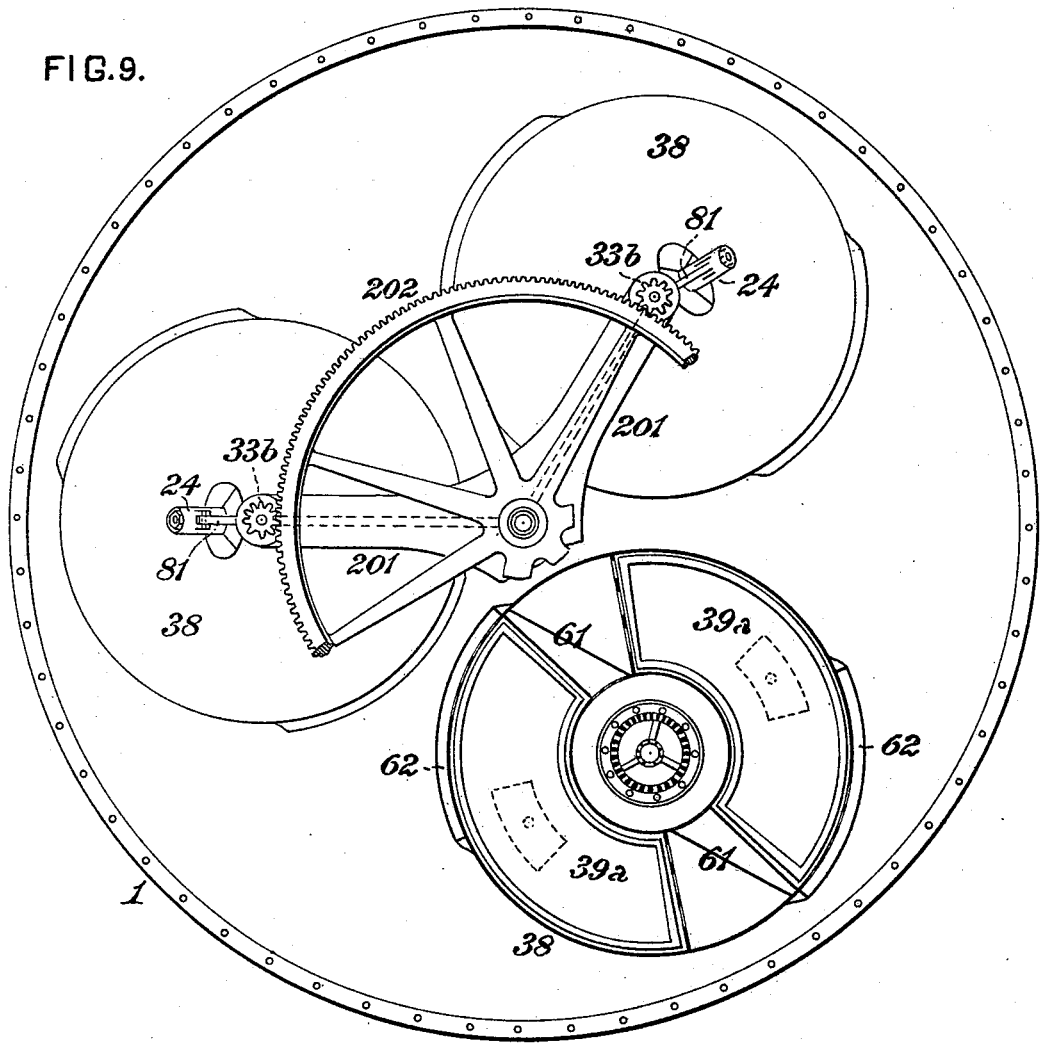

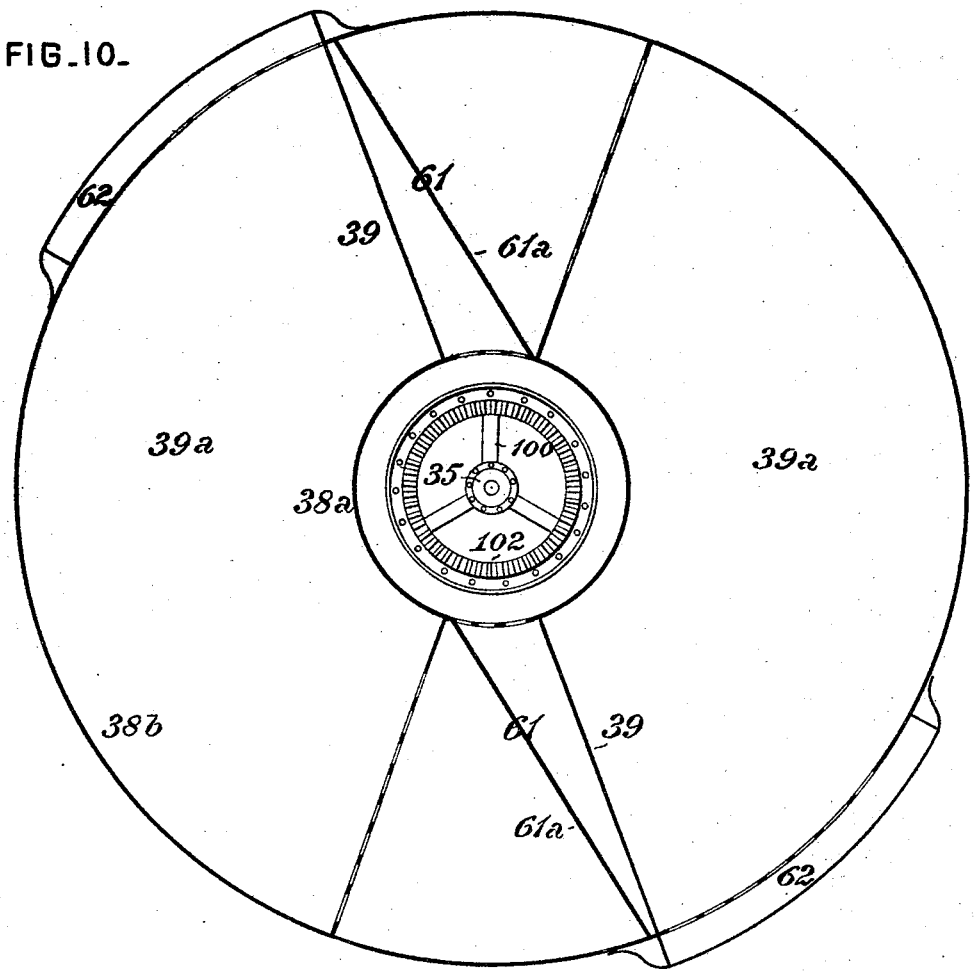

UNITED STATES PATENT OFFICE.

CHAUNCEY N. DUTTON, OF PITTSBURG, PENNSYLVANIA, ASSIGNOR TO THE FUEL GAS AND MANUFACTURING COMPANY, OF SAME PLACE.

GAS-METER.

SPECIFICATION forming part of Letters Patent No. 459,328, dated September 8, 1891.

Application filed December 15, 1890. Serial No. 374,784. (No model.)

*To all whom it may concern:*

Be it known that I, CHAUNCEY N. DUTTON, a citizen of the United States, residing at Pittsburg, in the county of Allegheny and State of Pennsylvania, have invented or discovered a certain new and useful Improvement in Fluid-Meters, of which improvement the following is a specification.

My invention relates to fluid-meters of the general type or class set forth in Letters Patent of the United States No. 400,420, granted and issued to George Westinghouse, Jr., and myself under date of March 26, 1889, and No. 441,614, granted and issued to The Fuel Gas and Manufacturing Company as my assignee under date of November 25, 1890.

The object of my invention is to provide fluid-meters, more particularly station-meters and meters of large size generally, which shall present the features of advantage of those of the above-recited Letters Patent—that is to say, accuracy of measurement under material variations of discharge conditions, smoothness and delicacy of operation, comparatively large measuring capacity relatively to any determined size, and freedom from the pulsations and irregularities incident to the operation of large meters as ordinarily heretofore and now constructed, and in which mechanical friction may be reduced as far as practicable with a consequent and corresponding increase of durability. The fluid-meters of the above-recited Letters Patent comprise a sheet-metal measuring-shell having a series of measuring-receptacles which are closed at top and open at bottom, said shell operating about an axis in a case containing a sealing-fluid, in which the lower edges of the measuring-receptacles are permanently sealed, so as to prevent ingress or egress of the fluid to be measured, except as regulated by a valve or valves properly actuated and controlled by an automatic valve-actuating mechanism connected with and operated by the measuring-shell. The employment of valves, while fully satisfactory and economical in meters of small or moderate sizes, has been found in some cases to be undesirable; and my present invention is specially designed to dispense with valves, thereby materially reducing mechanical friction, and to avoid the use of members subject in operation to destructive wear.

The improvement claimed consists in certain novel devices and combinations hereinafter fully set forth.

The meter of my present invention may be generally described as consisting of a shell or case containing a suitable sealing-fluid and having a lower inlet-pipe and an upper outlet-pipe connection, the inlet being extended upwardly in the case in tubular form to a height somewhat above the level of the sealing-fluid and supporting a bearing in which is pivoted an annular sheet-metal measuring shell or drum divided into a series of compartments and having a progressive wave-like motion or libration within the shell about the upper end of the inlet and the bearing thereon, the measuring-shell being controlled and held in a fixed limit of motion by a pivoted link connection coupling a shaft journaled on the measuring-shell to a shaft journaled in the case, the latter shaft actuating a registering mechanism. The measuring-shell is so subdivided that each of its measuring-compartments is provided with an inlet-passage and port and an outlet-passage and port formed upon and integral with the measuring-shell and so determined to the measuring-compartments in dimensions and angular and vertical relation that the motion of the measuring-shell successively unseals and seals the ports of the several inlet and outlet passages in the sealing-fluid, thereby admitting fluid to be measured to the measuring-compartments at periods and in quantities proper to charge them and exhausting the fluid to be measured from the compartments to the outlet connection. This operation is resultant upon the disposition of the integral parts of the measuring-shell and their varying movements relatively one to another and to the sealing-fluid, and is effected automatically and with perfect smoothness and regularity without involving the employment of any other or further member or appliance.

Figure 2:
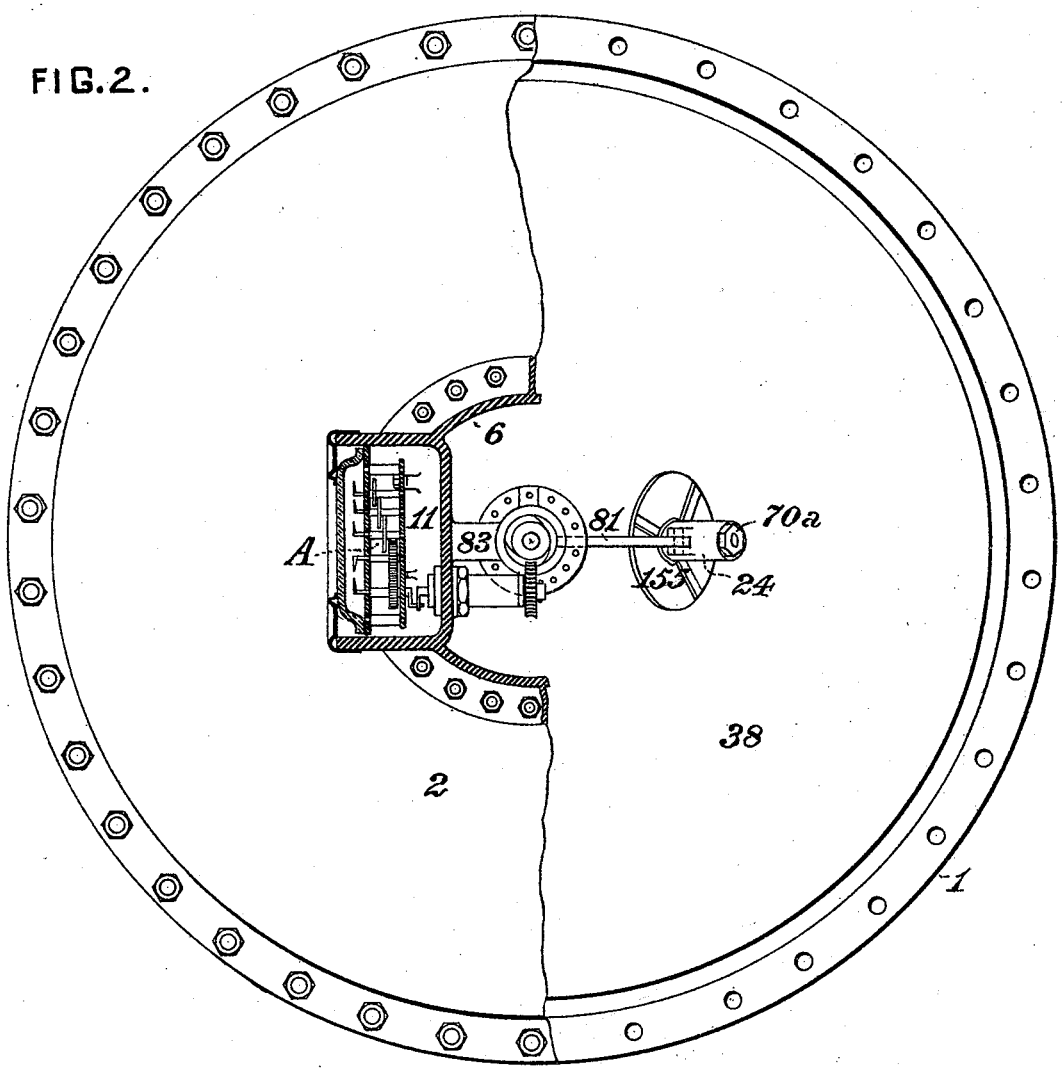
Figure 3:
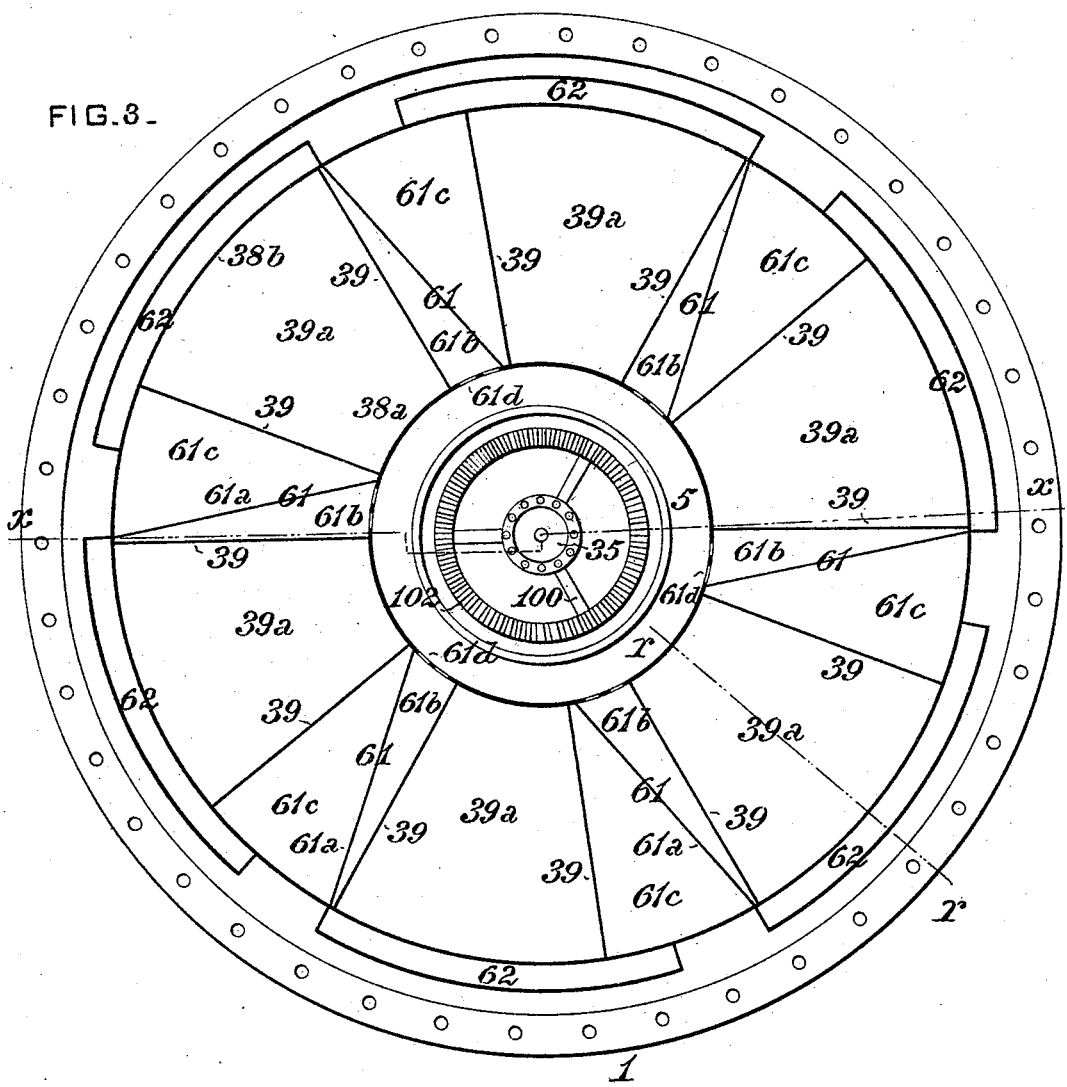
Figure 4:
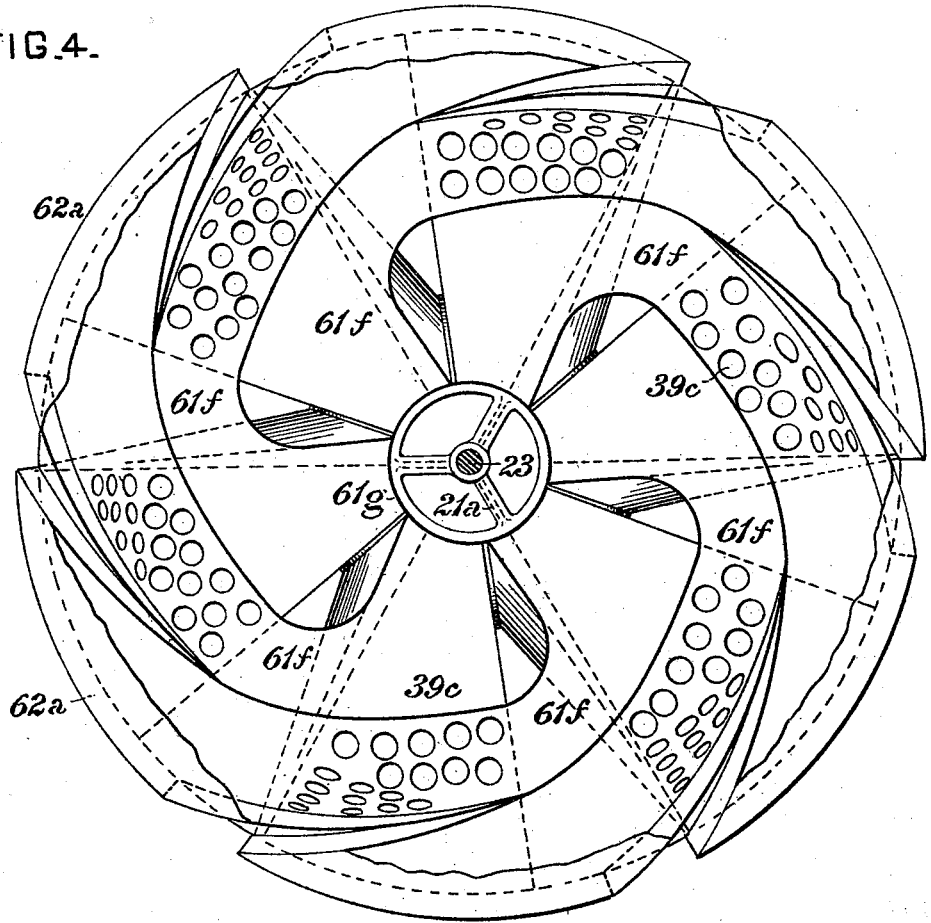
Figure 5:
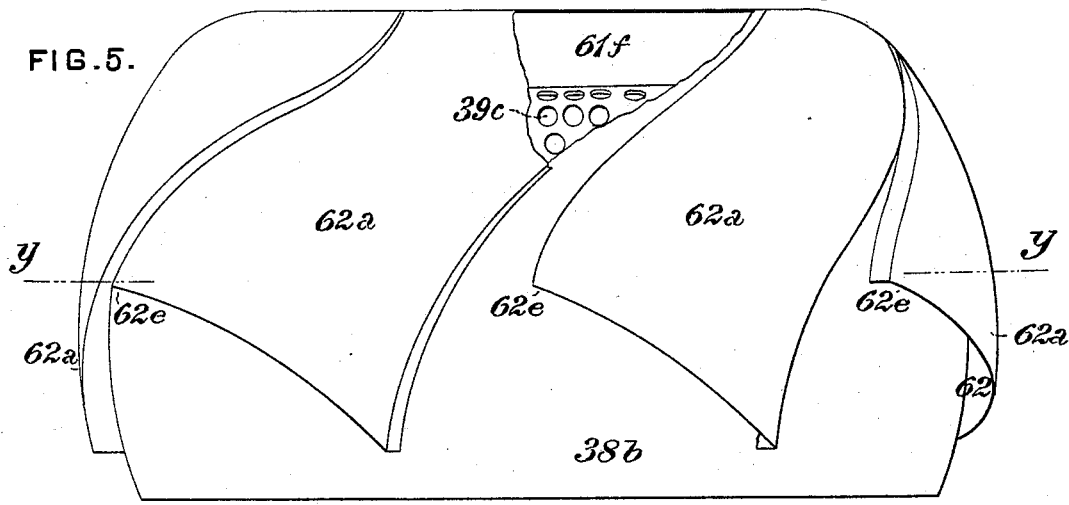
Figure 6:
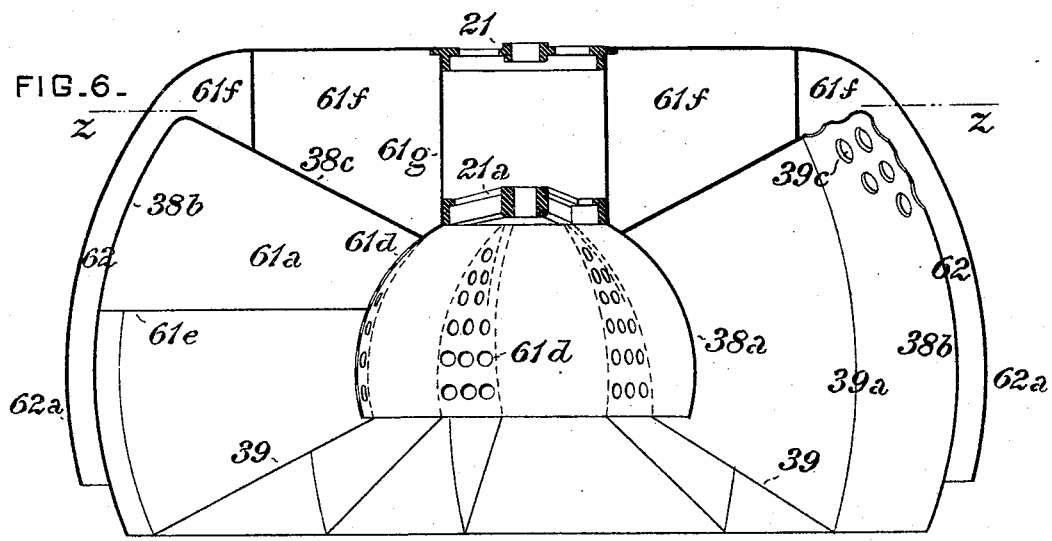
Figure 7:
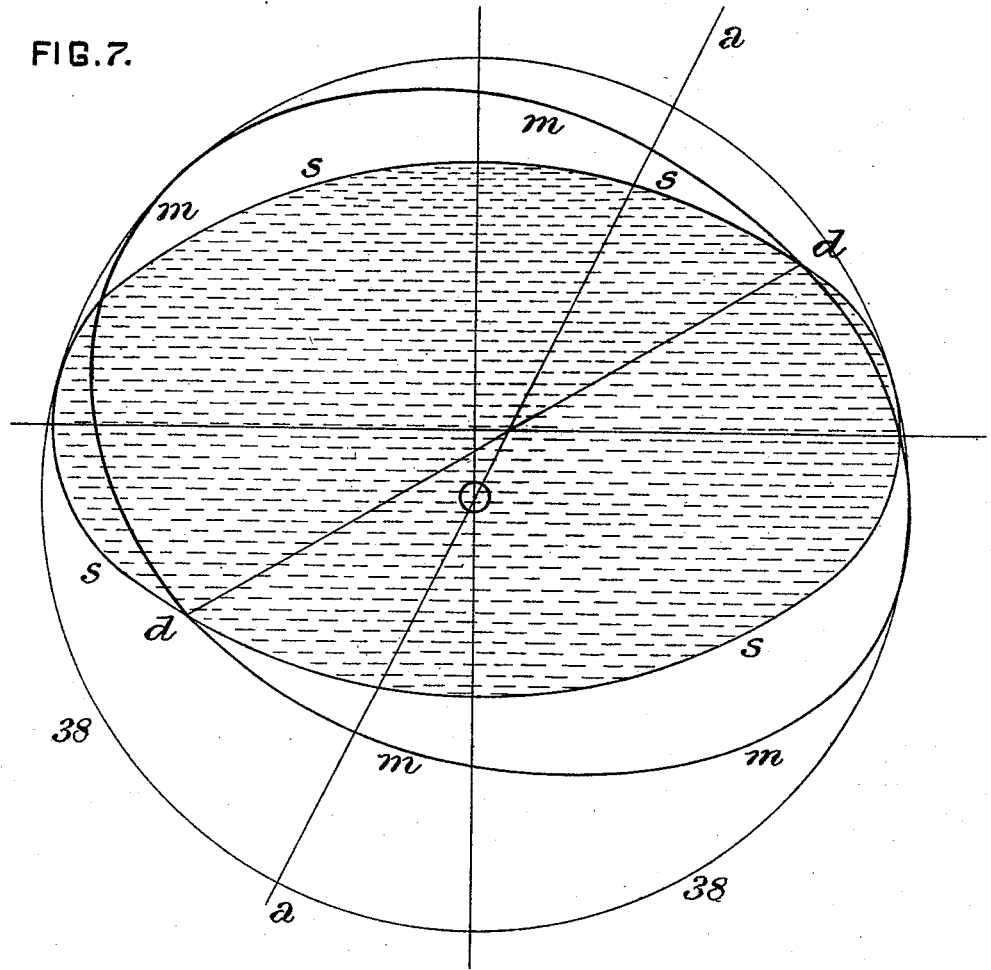

In the accompanying drawings, Figure 1 is a vertical section through a meter embodying my invention at the line $xx$ of Fig. 3; Fig. 2, a plan or top view, with the register-case in section and the right-hand half of the upper section of the case removed; Fig. 3, a horizontal section through the measuring-shell at the line $y\ y$ of Fig. 5; Fig. 4, a similar section at the line $z\ z$ of Fig. 6; Fig. 5, a side view in elevation of the measuring-shell; Fig. 6, a vertical central section through the same; Fig. 7, a diagrammatic view illustrating the plane of mean stroke; Fig. 8, a vertical central section through a meter, illustrating the application of a series of measuring-shells; Fig. 9, a plan or top view of the same with the upper section of the case removed, and Fig. 10 a horizontal section through one of the measuring-shells.

In the practice of my invention I provide a meter shell or case composed of a lower section 1, which is substantially in the form of a frustum of a sphere, an upper section 2, connected to the lower section by bolts passing through outwardly-projecting flanges at the meeting edges of the sections, and a cap 6, closing a central opening in the top of the upper section and having a register-chamber 11 at one of its ends and an outlet or discharge nozzle or connection 52 at the other. The lower section of the case is provided with suitable lugs or supporting-standards $1^a$ and has a central opening 3 in its bottom plate, to which is connected a supply or inlet pipe 48 for the inflow of fluid to be measured, the inlet being continued by a central vertical tube 5, connected to the bottom plate around the opening 3. The tube 5 extends upwardly within the case to a plane slightly above the normal level of a suitable sealing-fluid, which is supplied through a lateral filling-tube 50, formed upon one side of the lower casing-section 1 and closed by a proper screw-plug.

A flange or supporting-shoulder 7 is formed upon the tube 5, a short distance below its top for the connection of a universal-joint and guide mechanism C, which supports the measuring-shell 38, and is designed to obtain smoothness of operation with greater angular throw than is practicable in the use of the specific universal-joint mechanism set forth in the Letters Patent aforesaid. To this end a skeleton frame or spider 100 is secured to the shoulder 7 of the central inlet-tube 5, said frame having a central hemispherical socket 35, provided with a bottom opening $35^a$, for the escape of dirt and foreign matter that would tend to cause wear, and having fixed on its upper and outer surface a bevel-gear 102. The socket 35 supports a ball or spherical bearing-piece 34, which is fixed upon the lower end of a stem 23, and is held in position by a cap $34^a$, connected to the socket 35, and having a central opening through which the stem 23 moves freely in a conical path. The stem 23 supports and controls the movements of the measuring-shell 38, and carries upon its lower end a bevel-gear 103, which meshes with the fixed bevel-gear 102.

The measuring-shell is connected to the stem 23 through the intermediation of upper and lower skeleton frames 21 $21^a$, which fit truly in and are secured peripherally to the wall of a vertical central passage in the measuring-shell, and are provided with central sleeves or rings, through which the stem 23 passes and to which it is secured. These frames insure the proper relation and spacing of the elements of the measuring-shell about its axial line. Collars $23^a$ are formed upon the stem 23 adjacent to the ball-bearing 34, bevel-gear 103, and frames 21 $21^a$, to facilitate and maintain the connection of the parts in proper relation. The outer and upper frame 21 is left open until the measuring mechanism is set in place and secured in the case, after which the openings in the frame are permanently closed by a plate 155, soldered or otherwise secured to the frame 21. The bevel-gear 103 is secured upon the stem 23 at a distance above the center of the ball-bearing 34 equal to the distance of the fixed gear 102 below said center, the gear 103 meshing with and rolling upon the gear 102. The successive contact and proper fit of the teeth of the two gears guide and control the libratory movements of the measuring-shell by preventing its rotation.

A shouldered bearing 70 is formed upon the outer end of the stem 23 or on a bushing 71, secured thereon, and a sleeve or bushing 24 is fitted to work freely thereon. The sleeve 24 is held longitudinally by a nut or washer $70^a$ on the outer end of the stem 23, and is provided with a slotted lateral projection or pair of lugs 80, to which is pivoted one end of a link 81, the opposite end of which is pivoted to a slotted head $33^a$, fixed upon the lower end of a register driving-shaft 33, which is journaled in line axially with the socket 35 and ball-bearing 34 in an adjustable tubular bearing 82, having an external thread, which engages a corresponding thread in an arm or support 83, fixed to the cap 6 of the case. A shaft 33 carries a worm 84, which engages a worm-wheel actuating a suitable indicating and registering mechanism A, inclosed in a register chamber or case 11. The register-casing and register-actuating mechanism are substantially similar to those set forth in Letters Patent No. 441,095, granted and issued to the Fuel Gas and Manufacturing Company as my assignee, under date of November 18, 1890, and are not, therefore, claimed as of my present invention.

The proper location of the measuring-shell relatively to the center of the ball-bearing about which it moves is established and maintained by the adjustment and contact of the finished rims and shoulders of the frames 21 $21^a$, secured to the stem 23 and the adjacent surfaces of the measuring-shell connected thereto, and by the contact of the ball-bearing 34, gear-wheel 103, and frames 21 $21^a$ with the turned portion and the shoulders, respectively, of the stem. Thus all the relations of the measuring-shell and universal-joint mechanism with respect to their common center are made to depend upon the turned and shouldered portions of the stem 23 and the finished members in immediate contact therewith, thus greatly facilitating the accurate fitting up of the work.

The sheet-metal measuring-shell 38 is provided with an inner body $38^a$ in the form of a frustum of a sphere, which surrounds the upper portion of the central inlet-tube 5, an outer body $38^b$, concentric with the inner body, a closed top $38^c$, connecting the inner and outer bodies, and radial partitions 39, dividing the annular space between the inner and outer bodies into a succession of alternately-arranged open-bottomed measuring-compartments $39^a$ and inlet-passages 61. The inlet-passages 61 are divided diagonally each by a vertical plate $61^a$, which extends part way down the inlet-passage and divides the upper portion of the passage between the radial partitions 39 thereof into two parts $61^b$ and $61^c$. The lower undivided portion of the inlet-passage 61 and the smaller division $61^b$ thereof communicate freely with the space within the inner body $38^a$ of the measuring-shell through openings $61^d$ in said body $38^a$. The smaller division $61^b$ is closed at top by the plate $38^c$ of the shell, and the larger division $61^c$ opens through said plate $38^c$ into a channel $61^f$, which extends in curvilinear form above the plate $38^c$ to one of the measuring-compartments $39^a$.

It will be seen from the above construction that when the inlet-passage 61 is depressed relatively to the sealing-fluid so that the edge of the dividing-plate $61^a$ is immersed and sealed therein the smaller division $61^b$ communicates freely with the central space in the measuring-shell and the inlet-tube 5; but all communication of the supply-inlet and the division $61^b$ with the division $61^c$ and the channel $61^f$ is cut off by the sealing-fluid and the plate $61^a$. When the passage 61 is raised so as to unseal the edge of the plate $61^a$, all parts of the inlet-passage 61, the channel $61^f$, and the measuring-compartment communicate freely with the central space in the measuring-shell and the inlet-tube 5.

The communication between the several inlet-passages 61 and the several measuring-compartments $39^a$ is successive or progressive around the measuring-shell. The channels $61^f$ surround a central cylindrical shell $61^g$, continuing the inner body $38^a$ to the top of the channels $61^f$, the skeleton frames 21 $21^a$ being secured to the shell $61^g$. Outlet-passages 62, also severally freely communicating above the sealing-fluid level with the several measuring-compartments through openings $39^c$ in the plate $38^c$, are connected to the measuring-shell, being either built upon and united with the outer body $38^b$ or formed adjacent thereto by subdividing an annular space between said outer body and a concentric exterior shell $62^a$.

The bottom edges of the inner and outer spherical frustum bodies $38^a$ $38^b$ of the measuring-shell and the bottom edges of the partitions 39, which form walls of the measuring-compartments $39^a$ of the shell, are continuously immersed in the sealing-fluid, thus permanently closing the measuring-compartments at bottom by a liquid seal and preventing ingress or egress of fluid to be measured, except through the inlet and outlet passages. In order that fluid to be measured may be supplied to and exhausted from the measuring-compartments in proper quantities and at proper periods, the walls of the inlet-passages 61 and outlet-passages 62 are provided, respectively, with lower sealing edges $61^e$ and $62^e$, which seal and unseal the passages by entering and emerging from the sealing-fluid, thus closing and opening, respectively, said passages to the fluid to be measured. The sealing edges $61^e$ of the inlet-passages 61 are the lower edges of the plates $61^a$, which diagonally divide said passages, and the sealing edges of the outlet-passages are the lower edges of the outer walls $62^a$ thereof. Each passage has its sealing edge so disposed that one particular point therein, which, for explanation, may be termed the "governing-point," is first to unseal and last to seal, and so determines the beginning and the end of the opening and the closure, respectively, of said passage.

Openings $39^c$ are formed in the wall which separates each measuring-compartment from one of the channels $61^f$, the measuring-compartment thereby communicating with that one of the inlet-passages 61 which has its sealing edge about ninety degrees to one side—as, say, to the left—of the radial central plane of the compartment, and also with that one of the outlet-passages 62 which has its sealing edge about ninety degrees to the opposite side—say, to the right—of said radial central plane. Each measuring-compartment communicates freely above the level of the sealing-fluid through the openings $39^c$ with the inlet-passage on one side and with the outlet-passage on the other, and the measuring-compartment being continuously sealed at bottom by the sealing-fluid it receives fluid to be measured whenever the inlet-passage is opened by its sealing edge being raised above the sealing-fluid and exhausts it whenever the outlet-passage is similarly opened. Such action of the passages is alternate and opposite and is automatically effected by the movement of the measuring-shell relatively to the sealing-fluid.

In order that the opening and closure of the inlet and outlet passages may be effected without liability to cause the gas to be measured to be alternately compressed and dilated and the motion of the meter thereby rendered jerky, as well as to prevent fluid from passing through the measuring-compartments without being measured, the parts of the measuring-shell are relatively disposed and proportioned and move in the manner which will now be described. All references as to angular position are to an imaginary plane passing through the axis of the measuring-shell and the center of a measuring-compartment, said plane being termed the "radial plane" and indicated in Fig. 3 by the line $r\ r$. References to height are to an imaginary circular plane at right angles to the axis of the measuring-shell at the intersection of said axis with the normal level of the sealing-fluid and having its perimeter in the surface thereof. This imaginary circular reference-plane, which may be termed the "plane of mean stroke," is indicated in Fig. 7 by the letters $m\ m\ m\ m$, the line developing it, which is its intersection with the surface of the sealing-fluid, by the letters $d\ d$, the surface of the sealing-fluid by the letters $s\ s\ s\ s$, the measuring-shell by the reference-numeral 38, and the axis of the shell by the letters $a\ a$.

It has been before stated that the governing-point of the sealing edge of each inlet-passage, which is the outer end of said edge, is nearly ninety degrees to one side and the governing-point of the sealing edge of each outlet-passage, which is the outer and upper end of said edge, is nearly ninety degrees to the opposite side, respectively, of the radial plane of the measuring-compartment with which said passages communicate. If these governing-points were each exactly ninety degrees removed from the radial plane and their vertical positions were coincident with or above the plane of mean stroke, the fluid to be measured would blow through the shell above the surface of the sealing-fluid and would not be measured. Further, if they were so located angularly and were vertically depressed below the plane of mean stroke the edges on which they are located would seal and unseal in such manner and at such periods relatively to the reversal of motion of the measuring-compartment toward or away from the sealing-fluid as to induce compression and dilation of the fluid to be measured in the measuring-compartment, and would cause variations in pressure of the outflowing fluid, irregular discharge thereof, and jerky and irregular motion in the meter mechanism. To prevent the objectionable results above indicated, the angular position of the governing-point of the sealing edge of the inlet-passage is advanced, making it somewhat more than ninety degrees—as, say, one hundred degrees—removed from the radial plane, and the governing-point of the sealing edge of the outlet-passage is correspondingly drawn in, making it angularly distant somewhat less than ninety degrees— as, say, eighty degrees—from the radial plane, or vice versa. The vertical position of the sealing edges is so far below the plane of mean stroke that when the line joining them is parallel with the level of the sealing-fluid they are immersed to the depth determined as sufficient to retain the pressure sufficient to operate the meter. Under the above construction the depth of seal is equal or nearly equal to the sine of the angle of lead given to the passages multiplied by the sine of the angle of libration of the measuring-shell, or, in other words, to the distance measured vertically between the level of the sealing-fluid and a point on the periphery of the plane of mean stroke whose angular distance from the line of intersection of the said plane with the sealing-fluid is equal to the lead given to the passages with reference to the radial plane, which for convenience of description is here assumed to equal ten degrees. From the disposition of parts above described it follows that while the measuring-compartment is at the middle of its traverse relatively to the sealing-fluid and is moving relatively thereto at its maximum speed, becoming charged with or discharging fluid to be measured, the corresponding inlet and outlet passages are the one open to the fullest extent and the other sealed and completely closed, and those parts of the measuring-shell with which they are connected are moving, relatively to the sealing-fluid at their minimum speed. When the measuring-compartment is nearly charged with or discharged of fluid to be measured and nearly at an extremity of its traverse relatively to the sealing-fluid it is moving at its minimum speed relatively thereto, while those parts of the measuring-shell in which the sealing edges of the inlet and outlet passages are located are moving with maximum velocity relatively to the sealing-fluid, and the sealing edges of the passages are sealed and unsealed, the passages opened and closed, and the direction of the fluid to be measured reversed with rapidity relatively to the then slow movement of the measuring-compartment. This action alone would not, however, effect perfectly smooth discharge of measured fluid from and steady motion in the meter mechanism. To insure the accomplishment of these ends, the inlet-passage is so proportioned in capacity relatively to the measuring compartment and outlet-passage that when these three elements are sealed off from the remainder of the meter and are neither receiving nor discharging fluid to be measured the volume of such fluid contained in the three collectively is neither augmented nor diminished. The change of volume in that element of the three, the capacity of which increases by its movement, is equal to and counterbalanced by the change of volume in the other two elements, the capacity of which simultaneously decreases by their movement, or vice versa. For example, as the measuring-shell librates and the link 81, controlling its movements, swings in a circle above it a measuring-compartment is rising relatively to the sealing-fluid and being charged while the link is approaching a position coincident with the central radial plane of the compartment. When the link coincides therewith, the compartment is completely charged, and as the link swings away the motion of the measuring-compartment is reversed relatively to the sealing-fluid and exhaust begins, continuing until the link is one hundred and eighty degrees removed, or in the opposite position, when the measuring-compartment is in its lowest position. Exhaust then ceases and charging commences as the link again approaches the central radial plane. The opening of the inlet-passage being one hundred degrees, or thereabout, in advance of the radial central plane, and, further, having the governing-point in its sealing edge below the plane of mean stroke, it follows that the sealing edge of the inlet-passage seals and cuts off the supply of fluid to be measured when the link lacks twenty degrees, or thereabout, of coincidence with the radial central plane, and consequently when the measuring-compartment lacks some three per cent. of its ultimate charge of fluid to be measured. At such period the inlet-passage is just sealed and is descending rapidly toward the sealing-fluid, and its capacity is being reduced and fluid to be measured is being expelled from it into the measuring-compartment and outlet-passage, completing the charge of the measuring-compartment and augmenting that of the outlet-passage, as is necessary to avoid dilation or compression of fluid to be measured. Meanwhile, the measuring-compartment is slowly and the outlet-passage rapidly rising relatively to the sealing-fluid, their respective capacities being correspondingly augmented, and they are receiving and containing the fluid to be measured which is expelled from the inlet-passage.

If the three elements above specified—to wit, the inlet-passage, the measuring-compartment, and the outlet-passage—are so proportioned that the decrease in the capacity of the inlet-passage is equal or nearly equal to the increase in the capacities of the measuring-compartment and outlet-passage at such period, or from the time the inlet-passage seals to that when the outlet-passage unseals, then the fluid to be measured, which is expelled from the inlet-passage, will pass to and be contained in the other two elements, and this without compression or dilation or impairment of the smooth and regular motion of the meter. On the other hand, when the link is approaching the reverse position the outlet-passage seals when the link lacks about twenty degrees of such position and the measuring-compartment lacks three per cent., or thereabout, of being fully exhausted. The inlet-passage being, of course, sealed, the outlet-passage is sealed and descending rapidly, and the measuring-compartment descending slowly, relatively to the sealing-fluid. The motion of these elements transfers fluid to be measured to the inlet-passage, which is sealed and ascending relatively to the sealing-fluid, and which receives and contains (without compression or dilation) the surplus fluid to be measured, which is expelled from the other two elements, until the link passes the central reverse position, when the measuring-compartment begins to ascend relatively to the sealing-fluid, the inlet-passage unseals, and the measuring-compartment begins to be charged anew with fluid to be measured.

The fixed equalizing-chambers 8, Fig. 1, which are similar in design and function to those of the Lette s Patent before specified, are supported upon stands $4^b$, fixed upon an outwardly-projecting flange $5^a$ on the inlet-tube 5. The stands $4^b$ extend upwardly to the desired height and terminate in plates, to which the equalizing-chambers are attached. This construction greatly facilitates the erection of the meter, as the measuring mechanism is assembled upon the central tube 5, while it is outside the meter-case, and free access can be had to each and every part of the measuring mechanism, and when the same is completed the assemblage is placed in the case and bolted thereto by the flanged connections provided for the purpose.

In the operation of the meter fluid to be measured enters the case through the inlet-connection pipe 48 and central tube 5 and passes into the inner body $38^a$ of the measuring-shell above the sealing-fluid, and thence passes through such of the inlet-passages as may be open into the communicating measuring-compartments $39^a$. The upward pressure and buoyancy of the fluid to be measured as exerted in said compartments upon the measuring-shell 38 tends to raise the side of the shell which is subjected thereto and to depress and expel fluid to be measured from the opposite side. This tendency is controlled by the link 81 and converted into a libration or progressive wave-like motion, commonly called "wabbling." This motion is continuous and progressive about the center, and successive portions of the measuring-shell and of its periphery alternately advance toward and recede from the sealing-fluid, causing the inlet and outlet passages to be sealed and unsealed and the measuring-compartments to be charged with and exhausted of fluid to be measured.

From a comparison of different regular polygons or circles regularly subdivided it appears that the subdivisions best adapted to produce a successful meter of the construction hereinbefore described will be either six or two, any uneven number, as three or five, giving unequal and unbalanced pressures and resistances, and four subdivisions locating the inlet-passages fifty-five degrees, or thereabout, from the radial plane, which is so close thereto as to involve an unsatisfactory performance of the meter. With six or with two measuring-compartments the passages can be properly located. A shell with six measuring-compartments will always have equal numbers of measuring-compartments charging and discharging at the same time. The resistances will always be in similar ratio, and the operation of the meter will be smooth and easy and without tendency to halt, as either two or three measuring-compartments will always be receiving fluid, which exerts in them an upward pressure, and an equal number will be exhausting. With a single measuring-shell having two measuring-compartments both the compartments would simultaneously reverse their motion relatively to the sealing-fluid, both the inlet-passages and both the outlet-passages would be simultaneously sealed, and the meter would neither receive nor discharge fluid to be measured and would be inert and inoperative by failure of co-operation of its measuring apparatus with the supply and exhaust of fluid. Two or more shells, each having two measuring-compartments, may, however, be coupled in series by the employment of suitable synchronizing controlling mechanism, which regulates the operation of the several shells in proper time and angular relation, so that the result attained corresponds with that of a single shell having a greater number of measuring-compartments.

A construction as above indicated is exemplified in Figs. 8 to 10, inclusive, in which, as in the prior instance, the shell or casing is composed of a lower section 1, an upper section 2, a cap 6, provided with a register-chamber 11, and is closed at bottom by a hollow or chambered base $3^a$, which is accurately centered and secured to the lower section 1. An inlet or supply nozzle 48 is connected to one side of the base $3^a$, and three vertical inlet-tubes 5 are fixed to the top plate of the base above openings therein at equal distances from a central standard 200. An annular spherical frustum sheet-metal measuring-shell 38 is supported on each of the tubes near its top by a universal joint and guide mechanism C, similar to that before described. Each of the measuring-shells 38 is provided with two measuring-compartments $39^a$, two inlet-passages 61, located between the measuring-compartments, and each communicating directly with one of said compartments by openings in the separating-partition 39 and two outlet-passages 62, formed on the outside of the shell 38, each communicating directly with one of the measuring-compartments by openings in the outer wall $38^b$ of the shell. The elements of the measuring-shells are similar in relation and operation to those hereinbefore described, except in the particular that as there are but two principal divisions in each shell the measuring-compartments extend nearly ninety degrees on each side of their radial central planes adjacent to the passages and connect directly therewith without the employment of an intervening channel or passage, as in measuring-shells having a greater number of divisions.

In order that the several measuring-shells may move in normal relation one to another, they are coupled in series by a suitable synchronizing controlling mechanism, in the construction of which there are provided radial arms or supports 201, connected to the central standard 200 and projecting therefrom in direction to locate hubs or bosses on their outer ends in line axially with the inlet-tubes 5. An externally-threaded adjustable tubular bearing 82 is fitted centrally in the outer hub of each of the arms 201, and a shaft 33 is journaled in each of said bearings. The shafts 33 are coupled by links 81 to sleeves 24 on the stems 23 of the universal-joint mechanism of the measuring-shells and carry on their upper ends pinions $33^b$, which engage and rotate a spur-gear 202, journaled on the standard 200. The geared connection of the measuring-shells synchronizes their motions and controls their relative angular lead, so that when one measuring-shell is cut off from supply of fluid to be measured the other shell or shells are being charged therewith and are exerting their full effect in actuating the meter. The registering mechanism A is, as in the instance first described, driven by a worm 84, which may be either connected to the gear 202 or to one of the shafts 33.

In operation fluid to be measured enters the base $3^a$ by the inlet-nozzle 48 and passes through the inlet-tubes 5 into the measuring-shells 38, being measured therein, and by its upward pressure and buoyancy effecting the libratory movement of the measuring-shells as controlled by the interposed synchronizing mechanism.

I claim as my invention and desire to secure by Letters Patent—

1. In a fluid-meter, the combination of an inclosing case adapted to contain a sealing-fluid and provided with inlet and outlet connections, a measuring-shell divided into a series of measuring-compartments, a series of inlet-passages and a series of outlet-passages, each measuring-compartment communicating with an inlet-passage having an inlet-port opened by the unsealing of an edge thereof and with an outlet-passage having an outlet-port opened by the unsealing of an edge thereof nearly diametrically opposite to the inlet-port, a universal-joint mechanism supporting the measuring-shell, and two rotatable members coupled one to the other and journaled on the measuring-shell and independent thereof, respectively, substantially as set forth.

2. In a fluid-meter of the class described, an annular measuring-shell composed of inner and outer concentric bodies connected by a top plate, vertical partitions forming a series of open-bottomed measuring-compartments in the space between the inner and outer bodies, and a series of interposed inlet-passages, vertical walls separating two divisions of each inlet-passage, a series of inlet-channels each extending from a division of an inlet-passage to a measuring-compartment circumferentially in advance of said division, and a series of outlet-passages each extending from a measuring-compartment to an outlet opening or port circumferentially in rear of said compartment, substantially as set forth.

3. In a fluid-meter of the class described, a measuring-shell provided with inner and outer concentric walls, a space within the inner wall communicating directly with the meter-inlet, a series of measuring-compartments formed by partitions between the inner and outer walls, a series of inlet-passages formed in the shell between and alternating with the measuring-compartments, said inlet-passages connecting directly with the central space of the shell and each connecting with one of the measuring-compartments, and a series of outlet-passages formed on the outer wall of the measuring-shell and each connecting with one of the measuring-compartments, substantially as set forth.

4. In a fluid-meter of the class described, an annular spherical frustum measuring-shell having concentric inner and outer walls and a closed top, partitions subdividing the annular space between the concentric walls into a series of measuring-compartments and an equal series of inlet-passages alternating with the measuring-compartments, channels connecting each of the inlet-passages with one of the measuring-compartments, openings connecting each of the inlet-passages with the central division of the measuring-shell, plates each dividing the upper part of one of the inlet-passages and provided with a lower sealing edge, and a series of outlet-passages formed adjacent to the outer wall of the measuring-shell, each connecting with one of the measuring-compartments and provided with a lower sealing edge, substantially as set forth.

5. In a fluid-meter of the class described, an annular spherical frustum measuring-shell having concentric inner and outer walls and a closed top, partitions dividing the annular space between the concentric walls into a series of measuring-compartments and a series of inlet-passages alternating therewith, channels each connecting one of the inlet-spaces with one of the measuring-compartments, diagonal plates each dividing one of the inlet-passages in its upper part, so that the inner spherical wall of the inlet-space is on one side of the diagonal plate and the outer spherical wall is on the other side thereof, openings in the inner spherical wall of the inlet-passage without and below the diagonal plate, a lower sealing edge on the diagonal plate, an opening through the top plate of each inlet-passage behind the diagonal plate, a series of channels formed on the top of the measuring-shell, each leading from one of said last-specified openings and connecting an inlet-passage with a measuring-compartment, and a series of outlet-passages, each extending from a measuring-compartment in a direction away from the connected inlet-passage and provided with a lower sealing edge, diametrically opposite, or nearly so, to the sealing edge of the inlet-passage, substantially as set forth.

6. In a fluid-meter, the combination of a series of measuring-compartments adapted to be charged with and exhausted of fluid to be measured, inlet and outlet ports connected with each measuring-compartment and adapted to be opened and closed to permit the measuring-compartment to be charged and exhausted, inlet and outlet passages connecting the said inlet and outlet ports with the measuring-compartment, one of said passages being of greater capacity than the other, and port-controlling mechanism for opening and closing the inlet and outlet ports and cutting off the measuring-compartment from the supply or exhaust before said measuring-compartment is fully charged with or exhausted of the fluid to be measured and for expelling the excess of fluid to be measured from the larger of said passages into the measuring-compartment to fully charge it, or vice versa, substantially as set forth.

7. In a fluid-meter, the combination of an inclosing case adapted to contain a sealing-fluid, inlet and outlet pipe connections on said case, a series of measuring-compartments working in the case in connection with a sealing-fluid and adapted to be charged with and exhausted of fluid to be measured, inlet and outlet ports connected with each of the measuring-compartments and adapted to be opened and closed to permit the fluid to be measured to be supplied to and exhausted from the measuring-compartments, inlet and outlet passages connecting said ports with the measuring-compartment, one of said passages being of greater capacity than the other, and port-controlling mechanism for opening and closing the inlet and outlet ports and cutting off the measuring-compartment from the supply or exhaust before said measuring-compartment is fully charged with or exhausted of fluid to be measured and for expelling the excess of such fluid from the larger of said passages into the measuring-compartment, or vice versa, substantially as set forth.

8. In a fluid-meter, the combination of an inclosing case adapted to contain a sealing-fluid, inlet and outlet pipe connections on said case, a series of measuring-compartments adapted to operate about an axis, inlet and outlet passages adapted to advance and recede relatively to the sealing-fluid and provided with sealing edges adapted to connect a measuring-compartment with or cut it off from the supply and exhaust of fluid to be measured by the elevation or immersion of the sealing edges above or in the sealing-fluid, such cut-off occurring before the measuring-compartment is fully charged or exhausted, and one of said passages being of greater capacity than the other, so that when the measuring-compartment is so cut off from the supply or exhaust before being fully charged or exhausted the increasing immersion of the larger passage will expel its excess of fluid to be measured into the measuring-compartment to fully charge it, or vice versa, substantially as set forth.

—9. In a fluid-meter, the combination of an inclosing case adapted to contain a sealing-fluid, an outlet-pipe connection thereon, a series of inlet-tubes extending upwardly therein above the level of the sealing-fluid, a series of subdivided similar spherical frustum measuring-shells, each supported upon and adapted to receive a libratory motion about one of the inlet-tubes and carrying a rotatable member coupled to a rotatable member journaled axially above the said shell, and a synchronizing mechanism interposed between and connected with the several measuring-shells and regulating their motions relatively one to another, substantially as set forth.

10. In a fluid-meter, the combination of an inclosing case adapted to contain a sealing-fluid, an outlet-pipe connection thereon, a series of inlet-tubes extending upwardly therein above the level of the sealing-fluid, a series of subdivided similar spherical frustum measuring-shells, each supported upon and adapted to receive a libratory motion about one of the inlet-tubes, a vertical support fixed centrally in the meter-case, a series of shafts journaled in line axially with the inlet-tubes in bearings fixed to said support, pinions fixed to said shafts and meshing with a gear journaled in line axially with said support, and links each coupling one of said shafts with a rotatable member journaled on one of the measuring-shells, substantially as set forth.

11. In a fluid-meter of the type described, the combination of a measuring-shell, frames fitting in and secured to an inner wall of said shell, a turned and shouldered stem fitting centrally in and secured to said frames, a ball-bearing secured to said stem, and a fixed socket supporting said ball-bearing, substantially as set forth.

12. In a fluid-meter of the type described, the combination of a measuring-shell, a central stem connected thereto, a ball-bearing secured on said stem, a fixed socket supporting said ball-bearing, a bevel-gear fixed below and concentric with the bearing and socket, and a bevel-gear secured upon the stem and meshing with the fixed bevel-gear, substantially as set forth.

13. In a fluid-meter of the type described, the combination of an inclosing case, an inlet-tube connected removably thereto, a series of equalizing-chambers connected to the inlet-tube, a universal-joint mechanism supported on the inlet-tube, and a measuring-shell connected to and supported by said universal-joint mechanism, substantially as set forth.

14. In a fluid-meter of the type described, the combination of an inclosing case, an inlet-tube connected removably thereto, a series of equalizing-chambers connected to the inlet-tube, a universal-joint mechanism supported on the inlet-tube, a measuring-shell connected to and supported by the universal-joint mechanism, and two rotatable members, coupled one to the other and journaled on the measuring-shell and on the meter-case, respectively, substantially as set forth.

In testimony whereof I have hereunto set my hand.

CHAUNCEY N. DUTTON.

Witnesses:
J. SNOWDEN BELL,
R. H. WHITTLESEY.